United States Patent [19]

Nomura et al.

[11] Patent Number: 5,976,271
[45] Date of Patent: Nov. 2, 1999

[54] METHOD FOR THE PREPARATION OF RARE EARTH BASED ANISOTROPIC PERMANENT MAGNET

[75] Inventors: Tadao Nomura; Masaru Ito; Ken Ohashi, all of Fukui-ken, Japan

[73] Assignee: Shin-Etsu Chemical Co., Ltd., Tokyo, Japan

[21] Appl. No.: 09/055,822

[22] Filed: Apr. 6, 1998

[30] Foreign Application Priority Data

Apr. 21, 1997 [JP] Japan ..................................... 9-102838

[51] Int. Cl.⁶ ....................................................... C21D 1/04
[52] U.S. Cl. ........................... 148/103; 148/121; 164/477
[58] Field of Search ..................................... 148/103, 108, 148/121; 164/477

[56] References Cited

U.S. PATENT DOCUMENTS 4,715,891  12/1987  Ovshinsky et al. ...................... 148/103
4,854,979   8/1989  Wecker ................................... 148/103

OTHER PUBLICATIONS

"The Effect of Magnetic Field Treatment on Enhanced Exchange Coupling of ND2FVE14B/FE3B Magnet"—C.J. Yang, et al—IEEE Transactions of Magnets, vol. 32, No. 5, Sep. 1996, pp. 4428–4430—XP 000634031.

Patent Abstract of Japan, vol. 010, No. 035—Feb. 12 1986 & JP 60 194502A—Suwa Seikosha KK—Oct. 3 1985.

Patent Abstract of Japan, vol. 013, No. 374—Aug. 18 1989 & JP 01 128404A—TDK Corp.—May 22 1989.

*Primary Examiner*—John Sheehan
*Attorney, Agent, or Firm*—McAulay Nissen Goldberg Kiel & Hand, LLP

[57] ABSTRACT

Provided by the invention is a method for the preparation of a magnetically anisotropic permanent magnet mainly consisting of crystallites of the $Nd_2Fe_{14}B$ phase. The method comprises the steps of:(a) preparing an amorphous alloy of neodymium, iron and boron in molar fractions corresponding to the $Nd_2Fe_{14}B$ phase or a nanocomposite of the $Nd_2Fe_{14}B/Fe_3B$ or $Nd_2Fe_{14}B/Fe$ system, for example, by the melt-spun method; and (b) subjecting the amorphous alloy of neodymium, iron and boron to a heat treatment in a magnetic field of at least 3 T (tesla) at a temperature in the range from 550 to 800° C. for a length of time in the range from $1 \times 10^2$ to $1 \times 10^4$ seconds in an atmosphere of a non-reactive gas or vacuum.

6 Claims, No Drawings

METHOD FOR THE PREPARATION OF RARE EARTH BASED ANISOTROPIC PERMANENT MAGNET

BACKGROUND OF THE INVENTION

The present invention relates to a method for the preparation of a rare earth-based permanent magnet having outstandingly high magnetic anisotropy or, more particularly, to a method for the preparation of a rare earth-based permanent magnet of the neodymium-iron-boron type having outstandingly high magnetic anisotropy.

As is well known, a a method for the preparation of a rare earth-based permanent magnet of the neodymium-iron-boron type, referred to as a Nd—Fe—B magnet hereinafter, has very excellent magnetic properties and the material cost for the preparation thereof is remarkably low as compared with the samarium-cobalt magnets so that consumption of Nd—Fe—B magnets is rapidly increasing.

Like rare earth based magnet alloys of other types, the method for the preparation of a Nd—Fe—B magnet alloy includes the melting method and the quenching method, of which the former method is more widely practiced in the magnet industry than the latter method. In the melting method, high purity metallic or elemental materials of neodymium, iron and boron are taken in such a proportion as to correspond to the alloy composition of $Nd_2Fe_{14}B$ or somewhat richer than that relative to the amounts of neodymium and boron and they are melted together to form an alloy melt which is cast to form an ingot to be pulverized into fine particles having an average particle diameter of a few micrometers.

The fine particles of the rare earth based magnet alloy are then shaped by compression molding in a magnetic field to give a green body or powder compact which is subjected to a heat treatment first to effect sintering at a temperature of about 1100° C. and then for aging at a lower temperature to give a sintered rare earth magnet having magnetic anisotropy. The above mentioned compression molding of the alloy particles in a magnetic field is effective to accomplish alignment of the alloy particles relative to the axis of easy magnetization of the individual particles so as to impart the sintered magnet with magnetic anisotropy reported in, for example, Japanese Journal of Applied Physics, volume 26, 1987, page 785, by M. Sagawa, et al.

The above mentioned quenching method is also called the meltspun method, according to which a melt of the magnet alloy is ejected from an orifice at the surface of a quenching drum rotating at a high speed so that the alloy melt is instantaneously solidified in the form of a thin ribbon which is amorphous or has relatively low crystallinity (see, for example, Physics Letters, volume 46, 1985, page 790 by R. W. Lee, and other reports). The thus obtained thin ribbon of the magnet alloy by quenching is processed into a magnet body in several different ways including the processes called MQ1, MQ2 and MQ3.

In the MQ1 process, the quenched thin ribbons of the magnet alloy are pulverized into a fine powder which is blended with a resinous material as a binder and the blend is shaped into the form of a magnet body which is a kind of so-called bond magnets. Though advantageous in respect of the low costs for magnet production, the MQ1 process is disadvantageous due to the relatively low magnetic properties of the bond magnet which is not magnetically anisotropic but isotropic because no measure is undertaken for the alignment of the magnet particles relative to the axis of easy magnetization in addition to the low packing density of the magnet particles in the blend. In the MQ2 process, the thin ribbons obtained by quenching of the alloy melt are finely pulverized and shaped as such in a hot press into the form of a magnet body which is a magnetically isotropic bulk magnet. In the MQ3 process, the MQ2 magnet is further subjected to a plastic working at a high temperature so as to accomplish alignment of the axis of easy magnetization in the direction of compression. A further processing of the MQ3 magnet is reported, in which an MQ3 magnet is pulverized and the powder is blended with a binder resin to give a blend which is shaped by compression molding in a magnetic field so as to give a magnetically anisotropic bond magnet although this process is not industrialized because of the high costs for the process involving very complicated steps.

As compared with the anisotropic bulk magnets of Nd—Fe—B magnet alloys, bond magnets are mostly isotropic as is the case with the MQ1 magnets and anisotropic bond magnets are still at a beginning stage of development presumably due to the fact that a great decrease is caused in the coercive force of the magnet when an ingot of the Nd—Fe—B magnet alloy or a sintered magnet is finely pulverized.

In view of the above described problems, a method has been developed and is reported by T. Takesita, et al. in Proceedings of 10th International Workshop on Rare Earth Magnets and Their Applications, Tokyo, 1989, page 339, in which the $Nd_2Fe_{14}B$ alloy is subjected to a heat treatment in an atmosphere of hydrogen gas to give an agglomerate of fine crystallites of the alloy. This process comprises the successive steps of hydrogenation, disproportionation, desorption and recombination and sometimes called the HDDR process. It is further known that the particles obtained therein can be imparted with magnetic anisotropy when the alloy is admixed with certain adjuvant elements such as cobalt, gallium, zirconium, hafnium and the like so as to enable preparation of an anisotropic bond magnet of the Nd—Fe—B alloy. This method, which is relatively simple, is now under active investigations although several problems and disadvantages are involved therein that the crystallite diameter therein is larger by almost one order than in the quenching method to cause a difficulty in the application of the method to the nanocomposite materials discussed later, that a great danger against the workers' safety is unavoidable in the heat treatment in an atmosphere of hydrogen gas and that the desirable magnetic anisotropy cannot be obtained without addition of the adjuvant elements.

As an outcome of the development works for a rare earth based permanent magnet of the next generation having further improved magnetic properties, the so-called nanocomposite magnet materials are now highlighted as is reported in IEEE Transaction Magnetics, volume 27, 1991, page 3858 by E. F. Kneller, et al. and elsewhere. The nanocomposite magnet material is a two-phase composite dispersion system consisting of a hard magnetic phase and a soft magnetic phase each finely dispersed in the other with a fineness of the order of several tens of nanometers. By virtue of the magnetization coupling of both phases with the exchange interaction, the soft magnetic phase in the composite is strongly inhibited from inversion of magnetization so that the composite body as a whole exhibits a behavior like a single hard magnetic phase to give a possibility of obtaining a further increased saturation magnetization without causing a decrease in the coercive force. According to the calculation reported by R. Skomski, et al. in Physical Review, volume B48, 1993, page 15812, a maximum energy product $(BH)_{max}$ of as high as 137 MGOe could be obtained in the $Sm_2Co_{17}N_3/Fe\text{-}Co$ system assuming accomplishment of magnetic anisotropy therein.

The nanocomposite magnet systems heretofore investigated include the system of $Nd_2Fe_{14}B/Fe_3N$ reported by R. Coehorn in Journal de Physique, volume 49, 1988, page C8-669, $Nd_2Fe_{14}B/Fe$ disclosed in Japanese Patent Kokai 7-173501 and 7-176417 and reported by L. Withanawasam, et al. in Journal of Applied Physics, volume 76, 1994, page 7065, $Sm_2Co_{17}N_3/Fe$ reported by J. Ding, et al. in Journal of Magnetism and Magnetic Materials, volume 124, 1993, page L1, and others. As a method for the preparation of the two-phase composite systems in the nanocomposite materials disclosed there, a thin ribbon or powder of an amorphous alloy obtained by the melt-spun method or mechanical alloying method is subjected to a heat treatment to cause formation of microcrystallites.

Because of the non-alignment of the particles relative to the axis of easy magnetization, the nanocomposite magnets obtained heretofore are limited to isotropic magnets which are inferior to the magnetically anisotropic magnets in the magnetic properties.

SUMMARY OF TEE INVENTION

The present invention accordingly has an object, in view of and in order to overcome the above described problems and disadvantages in the rare earth-based permanent magnets of the prior art, to provide a novel method for the preparation of a magnetically anisotropic rare earth based permanent magnet or, in particular, a Nd—Fe—B magnet having outstandingly high magnetic properties including high magnetic anisotropy.

Thus, the method of the present invention for the preparation of a rare earth based anisotropic permanent magnet comprises the step of:

subjecting a neodymium-iron-boron alloy having a specified composition relative to the molar fractions of the respective elements in an amorphous state to a heat treatment at a temperature in the range from 550 to 800° C. in an atmosphere of a non-reactive gas or vacuum for a a length of time in the range from $1\times10^2$ to $1\times10^4$ seconds in a magnetic field of at least 3 T (tesla).

DETAILED DESCRIPTION OF THE PREFERRED EMBODIMENTS

As is described above, the starting material used in the inventive method is an amorphous rare earth based magnet alloy or Nd—Fe—B magnet alloy which can be prepared by quenching a melt of the alloy in the melt-spun method in the form of a thin ribbon. The amorphous alloy as the starting material should have amorphousness as complete as possible in such an extent that no diffraction peaks assignable to crystalline phases can be detected in the X-ray diffraction diagram taken by using a conventional X-ray diffractometer. Such a high degree of amorphousness of the alloy can be obtained in the meltspun method by keeping the peripheral velocity of the quenching drum at 30 meters/second or larger. When the starting alloy contains a substantial amount of microcrystallites or clusters, they act as the nuclei for crystallization in the subsequent heat treatment according to the inventive method resulting in a difficulty in obtaining good magnetic orientation in the magnetic field due to the growth of crystallites on the nuclei.

The Nd—Fe—B magnetic alloy as the starting material in the inventive method preferably has an elementary composition consisting of 11 to 15% by moles of neodymium and 2 to 10% by moles of boron, the balance being iron, in order to obtain high magnetic properties of the permanent magnet material as desired.

It is optional, however, that the starting alloy contains, besides neodymium, iron and boron, certain other elements by replacing a part of neodymium with yttrium or other rare earth elements to such an extent of, depending on the element of the rare earths, for example, up to 30% by moles for dysprosium and terbium, up to 5% by moles for the other rare earth elements excepting praseodymium and still higher extent than 30% by moles for praseodymium, by replacing a part of iron with up to 5% by moles of cobalt, nickel, copper, zinc, gallium, aluminum, silicon, scandium, titanium, vanadium, chromium, manganese, zirconium, niobium, molybdenum, ruthenium, rhodium, palladium, silver, cadmium, indium, tin, antimony, hafnium, tantalum, tungsten, rhenium, osmium, iridium, platinum, gold, mercury, thallium, lead and/or bismuth and by replacing a part of boron with up to 10% by moles of carbon, though merely as a permissible impurity. When the amounts of these substitute elements are too large, the resultant permanent magnet would suffer a decrease in the saturation magnetization.

In the inventive method, the amorphous Nd—Fe—B alloy is subjected to a heat treatment to effect crystallization by the precipitation of the phase of $Nd_2Fe_{14}B$. The heat treatment is conducted in an atmosphere of a non-reactive gas such as argon or vacuum in order to prevent oxidation or other reaction of the alloy at the temperature. The temperature of the heat treatment is in the range from 600 to 800° C. or, preferably, from 650 to 750° C. When the temperature is too low, precipitation of the $Nd_2Fe_{14}B$ phase as crystallites would be incomplete or precipitation of other undesirable phases takes place while, when the temperature is too high, crystal growth of the precipitated $Nd_2Fe_{14}B$ phase would proceed resulting in a decrease in the magnetic properties. The length of time for the heat treatment is selected in the range from $1\times10^2$ to $1\times10^4$ seconds. When the heat treatment is undertaken appropriately, a thin grain-boundary layer, which is a neodymium-rich phase containing 50% by moles or larger of neodymium, is formed around the crystallites of the precipitated $Nd_2Fe_{14}B$ phase.

The most characteristic feature of the inventive method consists in that the above mentioned heat treatment of the starting amorphous Nd—Fe—B alloy is conducted in a magnetic field of 3 T or larger in order to effect alignment of the axis of easy magnetization of the precipitated crystallites of the $Nd_2Fe_{14}B$ phase to obtain a magnetically anisotropic magnetic material.

As is known, the heat treatment of a magnet alloy in a magnetic field with an object to introduce magnetic anisotropy in a permanent magnet is undertaken for certain magnet alloys of the precipitation type such as alnico magnets. While an alnico magnet alloy causes disproportionation of the high-temperature phase $\alpha$ into a ferromagnetic $\alpha_1$ phase and a low-magnetization phase $\alpha_2$ by annealing, the $\alpha_1$ phase is formed in the form of elongated single-domain particles having a large shape anisotropy by annealing in a magnetic field in an actual procedure, the alnico alloy in the form of a single phase by undertaking solubilization at a high temperature is quenched to 950° C. in order to prevent precipitation of the $\gamma$ phase followed by annealing in a magnetic field of at least 0.15 T in a temperature range from 900 to 700° C. at a cooling rate of 0.1 to 2° C./second. Namely, the alnico permanent magnet is a magnet by utilizing the shape anisotropy of the $\alpha_1$ phase, for which it is important that the temperature of disproportionation is in the vicinity of the Curie point of the magnet alloy.

On the other hand, the same principle as in the alnico magnets is not applicable to the Nd—Fe—B magnet alloys since the Curie point of the $Nd_2Fe_{14}B$ phase is 312° C. to be substantially lower than the temperature of crystallization. The $Nd_2Fe_{14}B$ phase is paramagnetic at the stage of incipient formation of the crystallite nuclei. When the heat treatment is undertaken in a magnetic field having a gradient, a magnetic force acts on the material due to the magnetic gradient field as influenced by the extremely low magnetic susceptibility of the paramagnetic phase as is reported by Hirota, et al. in 1996. The magnetic force $f_M$ acting on a substance having a magnetic susceptibility $\chi$ is given by the equation:

$$f_M=(\chi-\chi_o)(H/\mu_o)(\partial H/\partial X),$$

in which $\chi_o$ is the magnetic susceptibility of the ambience of the substance, H is the magnetic field applied to the substance, $\mu_o$ is the vacuum permeability and $\partial H/\partial X$ is the gradient of the magnetic field at the position of the substance.

When the lattice vibration is surpassed by the magnetic force $f_M$, unidirectional alignment of the crystal nuclei as formed can be accomplished relative to the crystallographic orientation so that a magnetically anisotropic magnet in which the crystallites are aligned relative to the axis of easy magnetization can be obtained.

While the above given equation indicates that the magnetic force $f_M$ can be increased by increasing the gradient of the magnetic field $\partial H/\partial X$, no effective means is known for directly controlling this value. As an alternative and convenient means, the gradient of the magnetic field can be controlled by varying the maximum magnetic field H. The detailed experiments undertaken by the inventors by using varied values of H have led to a discovery that orientation of the $Nd_2Fe_{14}B$ phase as formed can be obtained when H is 3 T or larger.

The principle of the present invention is applicable also to any other nanocomposite materials in which precipitation of the $Nd_2Fe_{14}B$ phase is accompanied by the precipitation of a magnetically soft phase including, for example, a composite material of fine dispersion consisting of the $Nd_2Fe_{14}B$ phase and a magnetically soft $Fe_3B$ phase or Fe phase having a particle diameter not exceeding 50 nm.

When a nanocomposite material of the $Nd_2Fe_{14}B/Fe_3B$ system is desired, the starting Nd—Fe—B alloy should preferably have a chemical composition consisting of 1 to 10% by moles of neodymium and 10 to 25% by moles of boron, the balance being iron. Namely, the proportion of neodymium is substantially decreased and the proportion of boron is substantially increased as compared with the composition from which precipitation of the magnetically soft phase is not desired. When a nanocomposite material of the $Nd_2Fe_{14}B/Fe$ system is desired, the starting Nd—Fe—B alloy should preferably have a chemical composition consisting of 1 to 10% by moles of neodymium and 1 to 5% by moles of boron, the balance being iron. Such a low-boron alloy in an amorphous state can be obtained in the melt-spun method by further increasing the peripheral velocity of the quenching drum.

It is also optional in these cases with an object to improve the magnetic properties of the permanent magnet that the starting alloy contains, besides neodymium, iron and boron, certain other elements by replacing a part of neodymium with yttrium or other rare earth elements, by replacing a part of iron with cobalt, nickel, copper, zinc, gallium, aluminum, silicon, scandium, titanium, vanadium, chromium, manganese, zirconium, niobium, molybdenum, ruthenium, rhodium, palladium, silver, cadmium, indium, tin, antimony, hafnium, tantalum, tungsten, rhenium, osmium, iridium, platinum, gold, mercury, thallium, lead and/or bismuth and by replacing a part of boron with carbon. When the essential elements of neodymium, iron and boron are partly replaced each with the above named substitute elements, the total molar fraction of the substitute elements should not exceed 5%. When the molar fraction of these substitute elements is too large, the resultant permanent magnet would suffer a decrease in the saturation magnetization.

Control of the crystallite particle diameter is more important in the above described nanocomposite materials than in the non-nano-composite materials due to the magnetic exchange coupling between the magnetically hard $Nd_2Fe_{14}B$ phase and the magnetically soft $Fe_3B$ or Fe phase. Namely, the particle diameter of the magnetically soft phase of $Fe_3B$ or Fe should not exceed 50 nm in order to obtain good exchange-coupled material. In this regard, the heat treatment is undertaken at a temperature in the range from 550 to 800° C. or, preferably, from 600 to 700° C. When the temperature of the heat treatment is too low, precipitation of the $Nd_2Fe_{14}B$ phase would be incomplete or precipitation of a metastable phase of the composition $Nd_2Fe_{23}B_3$ or $NdFe_{12}B_6$ would take place not to give excellent magnetic properties while, when the temperature is too high, undue growth of the crystallites proceeds so that the exchange coupling force can no longer extend to the magnetically soft phase as a whole. The length of time for the heat treatment is selected in the range from $1\times10^2$ to $1\times10^4$ seconds and the rates for the increase up to and decrease from this temperature range should be as large as possible because the length of time is also a factor influencing the particle diameter. The heat treatment in this case is of course undertaken in a magnetic field of at least 3 T in order to accomplish magnetically anisotropic orientation of the $Nd_2Fe_{14}B$ phase.

In the following, the method of the present invention is illustrated in more detail by way of Examples and Comparative Examples, which, however, never limit the scope of the invention in any way.

EXAMPLES 1 AND 2 AND COMPARATIVE EXAMPLES 1 AND 2

Neodymium, iron and boron each in the elementary form having a purity of at least 99% were taken by weighing in such a proportion that the molar fractions thereof were 13.3%, 80.9% and 5.8%, respectively, and they were melted together in an arc melting furnace to give a uniform alloy of the elements. A 20 g portion of the alloy was re-melted in a fused silica glass tube and the melt was ejected out of the orifice of 1.5 mm diameter in the silica glass tube under pressurization with argon gas at the surface of a quenching drum of copper rotating with a peripheral velocity of 47.5 meters/second so as to obtain a solidified ribbon of the alloy which was found to be amorphous by the X-ray diffractometry with Cu Kα line as indicated by the absence of any diffraction peaks assignable to a crystalline phase.

The thus obtained ribbons of the amorphous Nd—Fe—B alloy were subjected to a heat treatment in a magnetic field by using an apparatus built by combining a tubular furnace with a superconductive magnet to generate a magnetic field with a gradient inside of the furnace tube at varied temperatures $T_a$ of 660 to 730° C. and in varied magnetic fields $H_a$ of up to 5 T as indicated in the Table below. Thus, the amorphous alloy ribbons were sealed in a fused silica glass tube under a pressure of 200 Torr of argon and the sealed tube was put into the furnace tube preheated at the specified temperature and, after the sealed tube reached the specified temperature, the tube was kept for 30 minutes at the same temperature followed by quenching in water.

The alloy ribbons after the above described heat treatment in a magnetic field were examined by the X-ray diffractometry with the Cu Kα line to find diffraction peaks assignable to the crystalline phase of $Nd_2Fe_{14}B$.

The alloy ribbons after the crystallization treatment were pulverized into fine particles which were put into molten paraffin and solidified therein in a magnetic field of 14 kOe to give a paraffin-bond magnet body. Measurement of magnetization was undertaken of the thus obtained paraffin-bond magnet body using a VSM by the application of a magnetic field of 20 kOe in a direction perpendicular to or parallel to the direction of the magnetic field during solidification in paraffin to give magnetizations of $I_n$ and $I_p$, respectively, to record the ratio of $I_n:I_p$ shown in the Table. The value of $I_n:I_p$ is a measure of the magnetic isotropy of the magnet or, in other words, a smaller value of $I_N:I_p$ ratio means a greater magnetic anisotropy of the magnet.

EXAMPLES 3 AND 4 AND COMPARATIVE EXAMPLES 3 AND 4

The experimental procedure in each of these Examples and Comparative Examples was substantially the same as in the preceding Examples except that the molar fractions of the alloying elements in the starting magnet alloy were 13.0% of neodymium, 78.5% of iron, 5.5% of boron, 2.5% of cobalt and 0.5% of silicon.

The Table below gives the temperature $T_a$ of the heat treatment, the magnetic field $H_a$ in the heat treatment and the ratio of $I_n:I_p$ of the paraffin-bond anisotropic magnet body.

EXAMPLES 5 AND 6 AND COMPARATIVE EXAMPLES 5 AND 6

The experimental procedure in each of these Examples and Comparative Examples was substantially the same as in the preceding Examples except that the molar fractions of the alloying elements in the starting magnet alloy were 4.0% of neodymium, 78.0% of iron and 18.0% of boron and that the length of time for the heat treatment was 5 minutes instead of 30 minutes. Each of the samples was found to consist of the $Nd_2Fe_{14}B$ phase and the $Fe_3B$ phase, the crystallites of the latter phase having a diameter not exceeding 50 nm.

The Table below gives the temperature $T_a$ of the heat treatment, the magnetic field $H_a$ in the heat treatment and the ratio of $I_n:I_p$ of the paraffin-bond anisotropic magnet body.

EXAMPLES 7 AND 8 AND COMPARATIVE EXAMPLES 7 AND 8

The experimental procedure in each of these Examples and Comparative Examples was substantially the same as in the preceding Examples except that the molar fractions of the alloying elements in the starting magnet alloy were 4.0% of neodymium, 75.0% of iron, 18.0% of boron, 2.0% of cobalt and 1.0% of chromium and that the length of time for the heat treatment was 5 minutes instead of 30 minutes. Each of the samples was found to consist of the $Nd_2Fe_{14}B$ phase and the $Fe_3B$ phase, the crystallites of the latter phase having a diameter not exceeding 50 nm.

The Table below gives the temperature $T_a$ of the heat treatment, the magnetic field $H_a$ in the heat treatment and the ratio of $I_n:I_p$ of the paraffin-bond anisotropic magnet body.

EXAMPLES 9 AND 10 AND COMPARATIVE EXAMPLES 9 AND 10

The experimental procedure in each of these Examples and Comparative Examples was substantially the same as in the preceding Examples except that the molar fractions of the alloying elements in the starting magnet alloy were 8.0% of neodymium, 88.0% of iron and 4.0% of boron and that the length of time for the heat treatment was 5 minutes instead of 30 minutes. Each of the samples was found to consist of the $Nd_2Fe_{14}B$ phase and the Fe phase, the crystallites of the latter phase having a diameter not exceeding 50 nm.

The Table below gives the temperature $T_a$ of the heat treatment, the magnetic field $H_a$ in the heat treatment and the ratio of $I_n:I_p$ of the paraffin-bond anisotropic magnet body.

EXAMPLES 11 AND 12 AND COMPARATIVE EXAMPLES 11 AND 12

The experimental procedure in each of these Examples and Comparative Examples was substantially the same as in the preceding Examples except that the molar fractions of the alloying elements in the starting magnet alloy were 7.0% of neodymium, 88.3% of iron, 3.5% of boron, 1.0% of cobalt and 0.2% of silicon and that the length of time for the heat treatment was 5 minutes instead of 30 minutes. Each of the samples was found to consist of the $Nd_2Fe_{14}B$ phase and the Fe phase, the crystallites of the latter phase having a diameter not exceeding 50 nm.

The Table below gives the temperature $T_a$ of the heat treatment, the magnetic field $H_a$ in the heat treatment and the ratio of $I_n:I_p$ of the paraffin-bond anisotropic magnet body.

TABLE

|  | $T_a$, °C. | $H_a$, T | $I_n:I_p$ |
|---|---|---|---|
| Example 1 | 680 | 5 | 0.34 |
| Example 2 | 660 | 3 | 0.55 |
| Comparative Example 1 | 710 | 1 | 0.96 |
| Comparative Example 2 | 730 | 0 | 0.96 |
| Example 3 | 650 | 5 | 0.32 |
| Example 4 | 700 | 3 | 0.51 |
| Comparative Example 3 | 660 | 1 | 0.96 |
| Comparative Example 4 | 690 | 0 | 0.96 |
| Example 5 | 680 | 5 | 0.58 |
| Example 6 | 660 | 3 | 0.76 |
| Comparative Example 5 | 710 | 1 | 0.97 |
| Comparative Example 6 | 730 | 0 | 0.97 |
| Example 7 | 650 | 5 | 0.54 |
| Example 8 | 700 | 3 | 0.70 |
| Comparative Example 7 | 660 | 1 | 0.96 |
| Comparative Example 8 | 690 | 0 | 0.97 |
| Example 9 | 680 | 5 | 0.61 |
| Example 10 | 660 | 3 | 0.73 |
| Comparative Example 9 | 710 | 1 | 0.97 |
| Comparative Example 10 | 730 | 0 | 0.97 |
| Example 11 | 650 | 5 | 0.69 |
| Example 12 | 700 | 3 | 0.76 |
| Comparative Example 11 | 660 | 1 | 0.97 |
| Comparative Example 12 | 690 | 0 | 0.96 |

What is claimed is:

1. A method for the preparation of a magnetically anisotropic permanent magnet mainly consisting of crystallites of $Nd_2Fe_{14}B$ phase which comprises the steps of:

(a) preparing an amorphous alloy of neodymium, iron and boron consisting of from 11 to 15% by moles of neodymium and from 2 to 10% by moles of boron, the balance being iron; and (b) subjecting the amorphous alloy of neodymium, iron and boron to a heat treatment at a temperature in the range from 550 to 800° C. for a length of time in the range from $1 \times 10^2$ to $1 \times 10^4$ seconds in a magnetic field of at least 3 T (tesla) in an atmosphere of a non-reactive gas or vacuum.

2. A method for the preparation of a magnetically anisotropic permanent magnet mainly consisting of nanocomposite crystallites of $Nd_2Fe_{14}B$ phase and $Fe_3B$ phase which comprises the steps of:

(a) preparing an amorphous alloy of neodymium, iron and boron consisting of from 1 to 10% by moles of neodymium and from 10 to 25% by moles of boron, the balance being iron; and (b) subjecting the amorphous alloy of neodymium, iron and boron to a heat treatment in a magnetic field of at least 3 T (tesla) at a temperature in the range from 550 to 800° C. for a length of time in the range from $1\times10^2$ to $1\times10^4$ seconds in an atmosphere of a non-reactive gas or vacuum.

3. A method for the preparation of a magnetically anisotropic permanent magnet mainly consisting of nanocomposite crystallites of $Nd_2Fe_{14}B$ phase and Fe phase which comprises the steps of:

(a) preparing an amorphous alloy of neodymium, iron and boron consisting of from 1 to 10% by moles of neodymium and from 1 to 5% by moles of boron, the balance being iron; and (b) subjecting the amorphous alloy of neodymium, iron and boron to a heat treatment at a temperature in the range from 550 to 800° C. for a length of time in the range from $1\times10^2$ to $1\times10^4$ seconds in a magnetic field of at least 3 T (tesla) in an atmosphere of a non-reactive gas or vacuum.

4. A method for the preparation of a magnetically anisotropic permanent magnet mainly consisting of crystallites of $Nd_2Fe_{14}B$ phase which comprises the steps of:

(a) preparing an amorphous alloy comprising neodymium, iron and boron containing from 11 to 15% by moles of a combination of neodymium and up to 30% by moles of at least one kind of rare earth elements including yttrium but excluding neodymium and from 2 to 10% by moles of boron, the balance being iron or a combination of iron and up to 5% by moles of at least one kind of substitute elements selected from the group consisting of cobalt, nickel, copper, zinc, gallium, aluminum, silicon, scandium, titanium, vanadium, chromium, manganese, zirconium, niobium, molybdenum, ruthenium, rhodium, palladium, silver, cadmium, indium, tin, antimony, hafnium, tantalum, tungsten, rhenium, osmium, iridium, platinum, gold, mercury, thallium, lead and bismuth; and (b) subjecting the amorphous alloy based on neodymium, iron and boron prepared in step (a) to a heat treatment at a temperature in the range from 550 to 800° C. for a length of time in the range from $1\times10^2$ to $1\times10^4$ seconds in a magnetic field of at least 3 T (tesla) in an atmosphere of a non-reactive gas or vacuum.

5. A method for the preparation of a magnetically anisotropic permanent magnet mainly consisting of nanocomposite crystallites of $Nd_2Fe_{14}B$ phase and $Fe_3B$ phase which comprises the steps of:

(a) preparing an amorphous alloy comprising neodymium, iron and boron containing from 11 to 15% by moles of a combination of neodymium and up to 30% by moles of at least one kind of rare earth elements including yttrium but excluding neodymium and from 2 to 10% by moles of boron, the balance being iron or a combination of iron and up to 5% by moles of at least one kind of substitute elements selected from the group consisting of cobalt, nickel, copper, zinc, gallium, aluminum, silicon, scandium, titanium, vanadium, chromium, manganese, zirconium, niobium, molybdenum, ruthenium, rhodium, palladium, silver, cadmium, indium, tin, antimony, hafnium, tantalum, tungsten, rhenium, osmium, iridium, platinum, gold, mercury, thallium, lead and bismuth; and (b) subjecting the amorphous alloy based on neodymium, iron and boron prepared in step (a) to a heat treatment at a temperature in the range from 550 to 800° C. for a length of time in the range from $1\times10^2$ to $1\times10^4$ seconds in a magnetic field of at least 3 T (tesla) in an atmosphere of a non-reactive gas or vacuum.

6. A method for the preparation of a magnetically anisotropic permanent magnet mainly consisting of nanocomposite crystallites of $Nd_2Fe_{14}B$ phase and Fe phase which comprises the steps of:

(a) preparing an amorphous alloy comprising neodymium, iron and boron containing from 11 to 15% by moles of a combination of neodymium and up to 30% by moles of at least one kind of rare earth elements including yttrium but excluding neodymium and from 2 to 10% by moles of boron, the balance being iron or a combination of iron and up to 5% by moles of at least one kind of substitute elements selected from the group consisting of cobalt, nickel, copper, zinc, gallium, aluminum, silicon, scandium, titanium, vanadium, chromium, manganese, zirconium, niobium, molybdenum, ruthenium, rhodium, palladium, silver, cadmium, indium, tin, antimony, hafnium, tantalum, tungsten, rhenium, osmium, iridium, platinum, gold, mercury, thallium, lead and bismuth; and (b) subjecting the amorphous alloy based on neodymium, iron and boron prepared in step (a) to a heat treatment at a temperature in the range from 550 to 800° C. for a length of time in the range from $1\times10^2$ to $1\times10^4$ seconds in a magnetic field of at least 3 T (tesla) in an atmosphere of a non-reactive gas or vacuum.

\* \* \* \* \*